No. 750,982. PATENTED FEB. 2, 1904.
J. E. KELLER, Jr.
VALVE FOR PNEUMATIC TIRES.
APPLICATION FILED MAY 11, 1903.
NO MODEL.
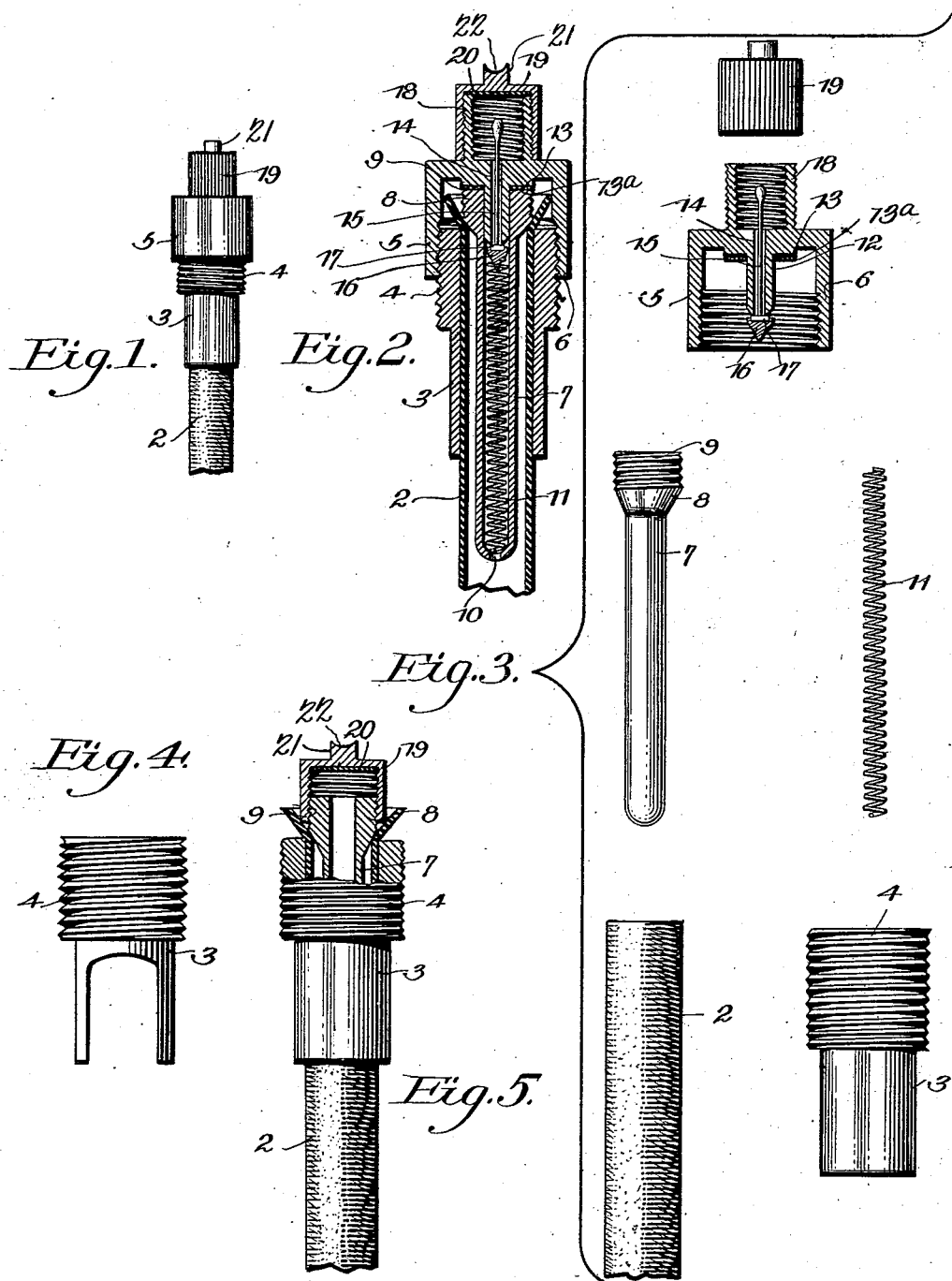

No. 750,982. Patented February 2, 1904.

UNITED STATES PATENT OFFICE.

JOHN ESTEN KELLER, JR., OF LITCHFIELD, CONNECTICUT.

VALVE FOR PNEUMATIC TIRES.

SPECIFICATION forming part of Letters Patent No. 750,982, dated February 2, 1904.

Application filed May 11, 1903. Serial No. 156,663. (No model.)

*To all whom it may concern:*

Be it known that I, JOHN ESTEN KELLER, Jr., a citizen of the United States, residing at Litchfield, in the county of Litchfield and State of Connecticut, have invented a new and useful Valve for Pneumatic Tires, of which the following is a specification.

This invention relates to valves for pneumatic tires, and more especially to valves designed for attachment to pneumatic tires having a rubber stem of tubular form for supporting the valve.

The principal object of the invention is to provide a valve for pneumatic tires of the type specified which may be attached to or detached from the tire-stem without the use of tools and in a very few moments and which when attached to the tire-stem will be held thereon with perfect security.

A further object of the invention is to provide a pneumatic-tire valve of such construction that the parts may be assembled and disassembled almost instantly, thus making the valve very easily cleanable.

A further object of the invention is to provide in a pneumatic-tire valve means for associating the valve with the tire-stem, which may be easily applied and which will effectively prevent leakage between the tire-stem and the valve-tube.

Other objects of the invention are to provide a tire-valve from which all dust and dirt will be effectively excluded, in which the number of parts is reduced to a minimum, and which may be manufactured at small cost.

With the above and other objects in view, which will appear as the invention is more fully disclosed, the same consists in the construction and combination of parts of a pneumatic-tire valve hereinafter described, illustrated in the accompanying drawings, forming a part of this specification, and having the novel features thereof particularly pointed out in the appended claims, it being understood that changes in the configuration, proportions, and exact mode of assemblage of the elements exhibited may be made without departing from the spirit of the invention or sacrificing any of its advantages.

In the drawings, Figure 1 is a view in side elevation of a tire-stem with the valve attached thereto. Fig. 2 is a view in longitudinal section through the tire-stem and the valve, the valve being shown as firmly secured to the tire-stem. Fig. 3 is a view chiefly in elevation of the tire-stem and the valve, showing the parts of the valve before they are clamped upon the tire-stem. Fig. 4 is a view in side elevation of a modified form of outer valve-tube. Fig. 5 is a view in side elevation, showing the valve-cover attached to the inner valve-tube to afford means for withdrawing the inner tube from the tire-stem.

Corresponding parts are designated by the same characters of reference in the several figures of the drawings.

Referring to the drawings in detail, 2 designates the rubber stem of tubular form, which is ordinarily provided on the inner surface of a pneumatic tire.

3 designates the outer valve-tube, which may cover a portion only of the stem 2, as shown, or which may cover the entire stem. The outer tube 3 is provided at its upper end with a collar 4, having threads upon its outer surface for engagement with internal threads upon the depending flange 6 of the cap 5.

7 designates the inner tube formed throughout the greater portion of its length of thin metal to constitute a retainer for a spring 11, and provided at is upper end with a flange 8, the under side of which is of conical form, as shown, and which has several screw-threads 9 cut on the outer surface at the top for the purpose that will hereinafter appear. The tube 7 is open at the top for the entrance of a downward projection 12 from the cap 5, which is adapted to form a valve-seat. At the lower end the inner tube 7 is slightly contracted and has an opening 10 for the passage of air.

The cap 5 above mentioned is provided on the under surface thereof with a downward projection 12 of proper size to enter the inner tube 7, and which projects downward from a boss 13, which forms a washer 13$^a$ against the top of said inner tube 7 to press it down into the stem 2 of the tire. The cap 5 is centrally perforated at 14, and extending through said perforation is a valve-stem 15, provided at the lower end with a tapered valve 16, the upper surface of which is countersunk for the insertion of a gasket 17, which contacts with the lower end of the projection 12, which forms the valve-seat. At its upper end the stem 15 is flattened, as shown, or otherwise distorted in form, so that when the cap 5 is removed from engagement with the collar 4 the stem will not drop out of the perforation. The valve 16 is of sufficient size to engage with and be supported by the spiral spring 11 in the inner tube 7, so as to keep the gasket 17 in the valve normally in contact with the seat formed at the lower end of projection 12 on the lower surface of cap 5.

In order to exclude dust and dirt from the interior of the valve, and thereby prevent obstruction thereof, the cap 5 has on the upper side thereof an upwardly-projecting flange 18, threaded upon the interior and exterior, as shown, and a cover 19 with rubber or other suitable packing material 20 on the under surface thereof and provided, preferably, with a projection 21, having the top thereof formed with a depression 22. The projection 21 serves to depress the valve-stem in order to deflate the tire, the depression 22 fitting over the end of the valve-stem and preventing disengagement of projection 21 therewith.

In order to apply the valve as above constructed to the tire-stem 2, outer tube 3 is slipped into position upon the tire-stem. The inner tube 7 is then introduced into the tire-stem, the spring 11 being contained therein, and the cap 5, carrying the valve-stem and valve, is then placed in position and screwed down upon the collar 4 of the outer tube 3, until the parts are in the position shown in Fig. 2. As the cap 5 is screwed down upon the collar 4 the rabbet 13 on the central downward projection 12 of the cap 5 engages with the upper end of inner tube 7 and forces it farther into the tire-stem 2, bringing the conical under side of the flange 8 into contact with the top of the tire-stem and forcing it downward, as seen in Fig. 2, and gripping the tire-stem tightly between the upper portion of collar 4 and the conical lower surface of flange 8, thus effectively securing the valve upon the tire-stem. The upper end of the tire-stem being forced outward by the conical under surface of flange 8 contacts with the inner surface of the flange 6 on cap 5 and with the upper surface of collar 4, thus aiding in making an air-tight joint between the valve structure and the tire-stem. When the parts of the valve are in the position shown in Fig. 2, the cover-cap 19 may be removed and a pump attached to the flange 18 for inflating the tire. The flange 18 is preferably of the same external diameter as the flange 8 on the inner tube 7, this relation being produced in order that when it is desired to withdraw the inner tube 7 from the tire-stem the cover 19, which is normally screwed upon the flange 18, may after the cap 5 has been disengaged from the outer tube be screwed upon the threads 9 on the flange 8 of inner tube 7, so that the cap 19 may form an extension of inner tube 7 and form an extension adapted be grasped for withdrawing said tube, as shown in Fig. 5.

Fig. 4 illustrates a modified form of the outer tube 3 fenestrated at the bottom, so that the sides of the tube may spring apart somewhat for the passage of the tube over the tire-stem.

It will be observed that a valve constructed as above described may be secured to a tire-stem in a very few moments, as all that is necessary is to slip the outer tube over the tire-stem, leaving the stem protruding the desired amount, then to introduce the inner tube 7 and screw the cap 5 down on the outer tube, as above explained. All of the above-mentioned operations may obviously be performed without the use of tools and with great quickness, the screwing of the cap 5 upon the outer tube being facilitated by having the outer surface of said cap milled or knurled to present a roughened surface, as shown in Fig. 1. It will also be observed that the valve may be detached from the tire-stem as readily as it may be attached thereto, the operations that are necessary to attach the valve being performed in the reverse order when it is desired to detach the valve.

Having thus described the construction and use of my invention, what I claim as new, and desire to secure by Letters Patent, is—

1. The combination in a valve for pneumatic tires, of an outer tube adapted to encircle a tire-stem, an inner tube adapted for introduction within the tire-stem, said inner tube having a flange with a low or conical surface provided at the upper end thereof and adapted to clamp said tire-stem against said outer tube, a cap adapted to engage said outer tube, to draw it upward and force said inner tube downward into clamping position, a valve-seat provided on the under surface of said cap, and a valve adapted to contact with said seat.

2. The combination in a valve for pneumatic tires, of an outer tube adapted to encircle a tire-stem, an inner tube adapted for insertion into the tire-stem, a flange having a conical lower surface provided at the top of said inner tube adapted to clamp said tire-stem against said outer tube, a cap adapted to engage said outer tube to draw it upward and to engage said inner tube to force it downward into clamping position, a valve-seat provided on the under surface of said cap, a valve adapted to engage with said seat, and a spring in said inner tube adapted to hold said valve normally in engagement with said seat.

3. The combination in a valve for pneumatic tires, of an outer tube adapted to encircle the tire-stem, an inner tube adapted to be introduced within the tire-stem, a flange having a conical lower surface provided at the upper end of said inner tube, a cap adapted to engage said outer tube to draw it upward, and to press said inner tube downward into clamping position, an opening in said cap for the passage of air, a screw-threaded flange projecting upward from said cap, an imperforate cover adapted to engage said screw-threaded flange and also adapted to engage the flange on said inner tube when it is desired to withdraw the inner tube from the tire-stem.

4. The combination in a valve for pneumatic tires having tubular rubber stems, of an outer tube adapted to encircle the tire-stem, an inner tube adapted to be introduced within the tire-stem and having at the top thereof a flange with a conical lower surface adapted to enter within the tire-stem and flare the same outward over the top of the outer tube, a cap adapted to engage said outer tube to draw it upward and to press said inner tube downward so that the flange at the top of the inner tube will force the upper end of the tire-stem against the side walls of the cap.

In testimony that I claim the foregoing as my own I have hereto affixed my signature in the presence of two witnesses.

JOHN ESTEN KELLER, JR.

Witnesses:
 JOHN L. BUEL,
 JOHN L. MOWER.